Nov. 14, 1939.                H. DIAMOND                2,179,499
METHOD OF BLIND LANDING FOR AIRCRAFT
Filed Aug. 5, 1932            3 Sheets-Sheet 2

Harry Diamond, Inventor
By J. F. Mothershead, Attorney

Nov. 14, 1939.     H. DIAMOND     2,179,499
METHOD OF BLIND LANDING FOR AIRCRAFT
Filed Aug. 5, 1932     3 Sheets-Sheet 3

Inventor
Harry Diamond
By J. F. Mothershead
Attorney

Patented Nov. 14, 1939

2,179,499

UNITED STATES PATENT OFFICE 2,179,499

METHOD OF BLIND LANDING OF AIRCRAFT

Harry Diamond, Washington, D. C., assignor to the Government of the United States as represented by the Secretary of Commerce Application August 5, 1932, Serial No. 627,626

2 Claims. (Cl. 250—11)

(Granted under the act of March 3, 1883, as amended April 30, 1928; 370 O. G. 757)

The invention described herein may be manufactured and used by or for the Government of the United States for governmental purposes only without the payment of any royalty thereon.

This invention relates to a system of aids which makes possible the safe landing of aircraft under adverse conditions of visibility or no visibility. While scheduled air transportation has been immeasurably aided by the provision of radio-direction facilities on the fixed airways of the United States, interruption of scheduled flying is still the rule whenever the landing field lies in an area completely inclosed by fog. The results secured by the development of instrument flying and of radio navigational aids to point-to-point flying are then nullified through the lack of means for safe landing. The rigorous maintenance of scheduled flying requires the removal of this last great hazard to the reliability of air travel and transportation. The principal object of my invention is to provide a system of aids which makes the safe landing of aircraft under adverse visibility conditions entirely practicable. Another object of my invention is the provision of a radio system for localizing airports, adaptable for use in conjunction with the radio navigational aids being provided for point-to-point flying on the civil airways of the United States. The above and other objects will appear more fully hereinafter in the detailed description of the invention which may be embodied in a number of forms, some of which are shown in the accompanying drawings. It is to be expressly understood, however, that the drawings are for purposes of illustration only and are not designed for a definition of the limits of the invention.

Any system of landing aids must give the pilot reliable and continuous information of the position of his aircraft in three dimensions (with respect to the landing field) as he approaches and reaches the point of landing. My system provides this information through the combination of four separate elements or combinations of elements which have distinctive and important functions. One element serves to guide the airplane to a point in the vicinity of the airport of fixed and known geographical position with respect to the airport. This is accomplished through the combination of a radio transmitter located at the desired point and a radio receiver and auxiliary equipment aboard the aircraft. The transmitter is preferably of the directive radiobeacon type which permits the use of simple receiving equipment on the aircraft, but may also be any transmitting arrangement, in which case the use of a direction finder aboard the aircraft is required. The second element of the system comprises means for enabling the pilot to circle the airport at a fixed radius, starting from the point of known geographical position already determined and ending at a point from which safe approach to the airport may be had. This element may consist of a radio transmitter located preferably at the center of the airport, a distance indicator on the airplane operated by the radiations from this transmitter and an additional instrument on the airplane from which the pilot may determine the portion of circumference of the circle (with fixed radius from the center of the airport) which he has covered at any given time. The third element of the system serves to guide the airplane laterally and longitudinally to the airport along the safe approach and informs the pilot when he has reached the confines of the field. This element may be the combination of a low-powered directive radiobeacon transmitter which produces a radio-beacon course coinciding with the desired direction of approach to the landing field and a number of marker beacons located at different distances from the landing field along the line of approach; or the radiobeacon may be replaced by a simple transmitter on the airport used in conjunction with a radio direction finder on the airplane and an additional instrument to take care of wind drift. In either case the dimensions of the antenna system must be small to permit location at the airport without constituting a hazard to flying. The fourth element of the system provides vertical guidance to the pilot, permitting him (once along the safe approach) to descend from any altitude in such a way as to clear obstructions and make a safe landing, preferably halfway (or less) along the desired runway.

My invention will be understood more in detail by reference to the following diagrams in which.

Figure 1:
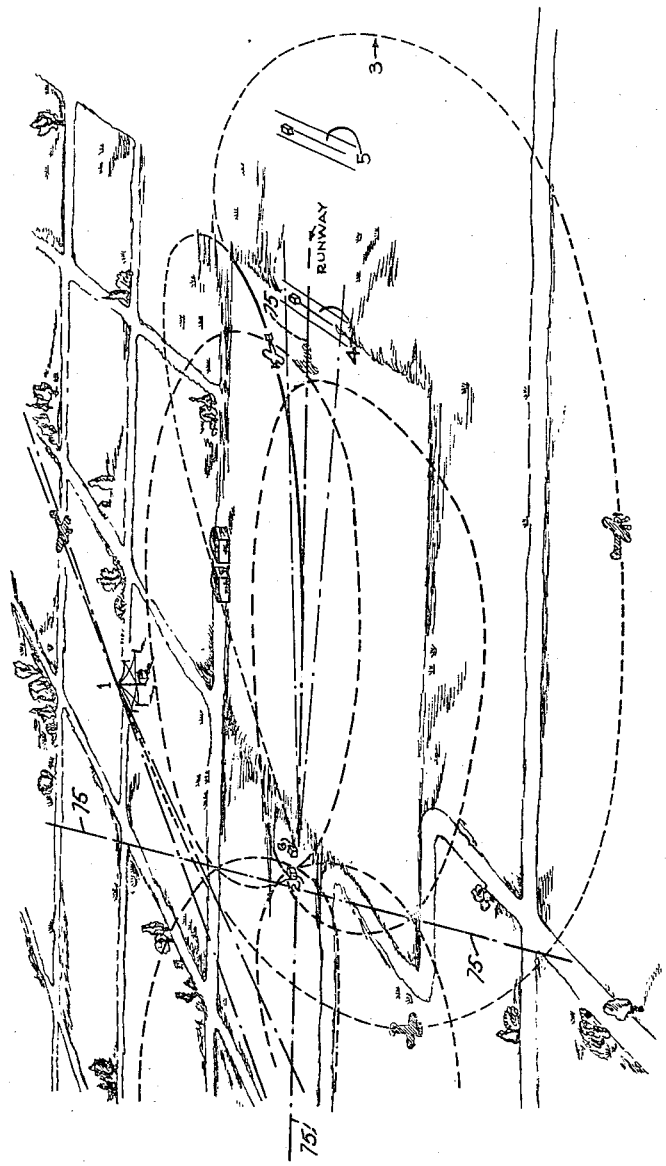
Figure 1 is a general illustration of one possible arrangement of ground equipment on an airport to carry out the objects of my invention and illustrates the method of use of this equipment.
Figure 3:
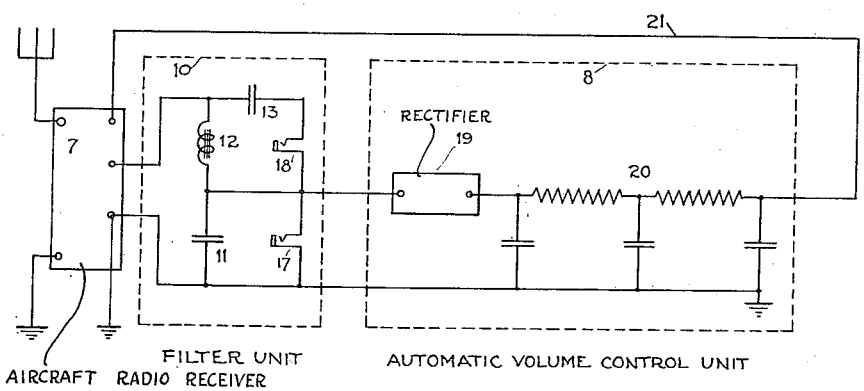

Figure 3 gives details of a receiving system on the airplane for utilizing the ground transmitting arrangement of Figure 1.

Figure 4:
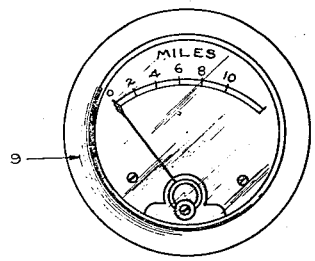

Figure 4 is a sketch of the distance indicator constituting a portion of the second element of my invention.

Figure 5:
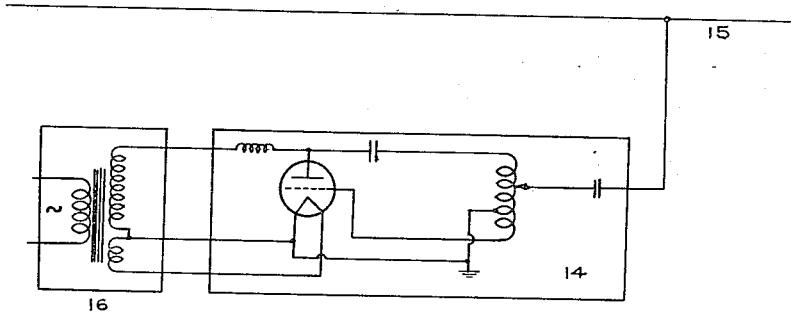

Figure 5 is a circuit diagram of the transmitter and transmitting antenna for the radio type of marker beacon.

Referring to Figure 1, the transmitting station shown at 1 constitutes a portion of the first element of the system of my invention. We will here assume that it is a directive radiobeacon transmitting station of either the aural or visual types such as are provided near the principal terminal airports of the United States. This radiobeacon used in conjunction with receiving equipment on the airplane serves to direct an incoming airplane to the vicinity of the landing field. One of the most important functions of the transmitting station 1 is its homing feature. It not only directs an airplane to the vicinity of the landing field but, in addition, indicates when the airplane is passing directly over the transmitting station, by means of a zero-signal zone effect. Utilizing the zero-signal zone, it is possible to locate the transmitting station to within 100 to 1000 feet depending upon the altitude of the airplane.

Before reaching this transmitting station, the pilot may learn of the wind conditions (particularly the wind direction) at the airport through radio communication with personnel at the airport or at other radio stations. Upon receiving the zero-signal indication over the transmitting station 1, the pilot tunes his receiving set to a second transmitting station 2 which is here shown to be located at the edge of the airport. In the arrangement shown in Figure 1, transmitter 2 serves as a portion of both the second and third elements of the system of my invention. When this transmitter is of the radiobeacon type it may be made to produce four beacon courses 75 at right angles to each other, one of these courses being aligned with the landing runway shown in Figure 1. The radiations from this transmitter are received by the airplane receiving set, which is provided with automatic volume control operation and, in addition, with an indicating device operated by the automatic volume control arrangement which gives a measure of the intensity of radiation at the receiving point from the transmitter 2. Since the intensity of radiation from a given transmitter varies in known relation with the distance from the transmitter, this indicator may be calibrated directly in miles from the transmitting station 2. Through the use of this indicator the pilot may, while circling the airport in order to get on the desired approach to it, maintain any desired fixed radius with respect to the transmitter 2, regardless of wind drift, etc. Knowing the location of the transmitting station 1 and of the desired runway approach 3, he knows the exact number of degrees along the circumference of the circle followed which he must cover. He has several ways to determine when he has covered the required amount; (a) through the use of a compass preferably of the gyroscopic type, on which may be read the total number of degrees of turn, (b) through the use of a conventional turn indicator in conjunction with a clock (the conventional turn indicator operates on a gyroscopic principle, a vertical pointer pivoted about one end swinging left or right depending on whether the aircraft is turning to left or to right, the amount of deflection of the pointer is proportional to the rate of turn of the aircraft, and the usual turn indicator is calibrated so that if the airplane is maneuvered to keep the pointer deflecting by an amount equal to the pointer width, a 360 degree turn is completed in two minutes), and (c) by counting the number of beacon courses (set up by transmitter 2) passed through by the airplane during the circling maneuvers. In the illustration shown the pilot would pass through three such courses stopping the circling maneuver on the fourth, which coincides with the desired direction of approach to the airport into the wind. It is evident that the means (c) for determining how far along the circumference of the circle the airplane has traveled is possible only when the transmitter 2 is of the radiobeacon type producing four courses. Upon reaching the point 3, the pilot begins to make use of the third element of my invention. In Figure 1 this consists of the transmitter 2 and the marker beacons 4 and 5. Lateral position of the airplane along the desired approach is given the pilot by means of the course indications in the output of the receiving set which is still tuned to the frequency of the transmitting station 2. When passing over the marker beacon 5 the pilot hearing the signal from this marker beacon knows that he is at a fixed distance from the landing field boundary, while when hearing the signal from marker beacon 4 he learns that he has reached the edge of the field. In case it is desired to use an ordinary transmitting station at 2 and a radio direction finder in the airplane, the course indications from the radio direction finder may be used to give lateral position of the airplane with respect to the desired line of approach. This is satisfactory if the wind direction is in exact opposition to the desired line of flight of the airplane. When the wind direction is at any other angle (except 180 degrees) it is necessary to use a compass (preferably of the gyroscopic type) in conjunction with the direction finder course indications in order to fly along the desired line of approach. The magnetic compass bearing of the line of approach is assumed to be known. The pilot maneuvers his airplane to follow this compass course and takes a direction finder bearing on the ground transmitter 2 to determine whether he is one side or the other of the desired line of approach. He then alters his compass course to make proper correction until his direction finder bearing corresponds to the true bearing of the line of approach. The amount of correction required is determined by trial and error. After a number of attempts the pilot will find that he is following a compass bearing differing from the true bearing of the line of approach by an amount such that the airplane is "crabbing" into the wind sufficiently to compensate for wind drift, and the direction finder bearing is the true bearing of the line of approach. The difference between the two is the angle of "crab." In case the wind should shift in magnitude or velocity, this angle of "crab" will vary. This is observed by the fact that while maintaining the new compass course the direction finder bearing differs from the true bearing of the line of approach. Close check of the two instruments are thus required throughout the flight to maintain a direction of flight coinciding with the desired landing direction.

The pilot having now oriented himself along the desired direction of approach to the landing field, it is necessary to give him vertical guidance so that he may reduce the altitude of his airplane, at the same time clearing all obstructions, and land, preferably halfway or less along the landing runway. In Figure 1, a landing beam transmitter 6 is provided for this purpose. This transmitter produces an ultra-high frequency radio beam the axis of which is inclined at a small angle to the ground. Receiving equipment is employed on the airplane for following a line of constant received signal on the underside of the axis of the beam. This path is asymptotic to the earth's surface and is a convenient path for the landing of the average airplane. The inclination of the axis of the beam and the degree of its directivity are so adjusted that for a given airport the path followed by the airplane automatically keeps it above all obstructions. The landing beam transmitting and receiving equipment do not form a portion of my invention. However, its use as the fourth element of my system does constitute a feature of my invention. In place of the landing beam it is possible to use any type of absolute altimeter giving true distance above the surface of the ground. When such an altimeter is employed, it is necessary to provide additional marker beacons along the desired approach, so that, knowing the obstructions for a given airport, the pilot may keep his airplane at a safe altitude at all points along the approach.

Figure 2:
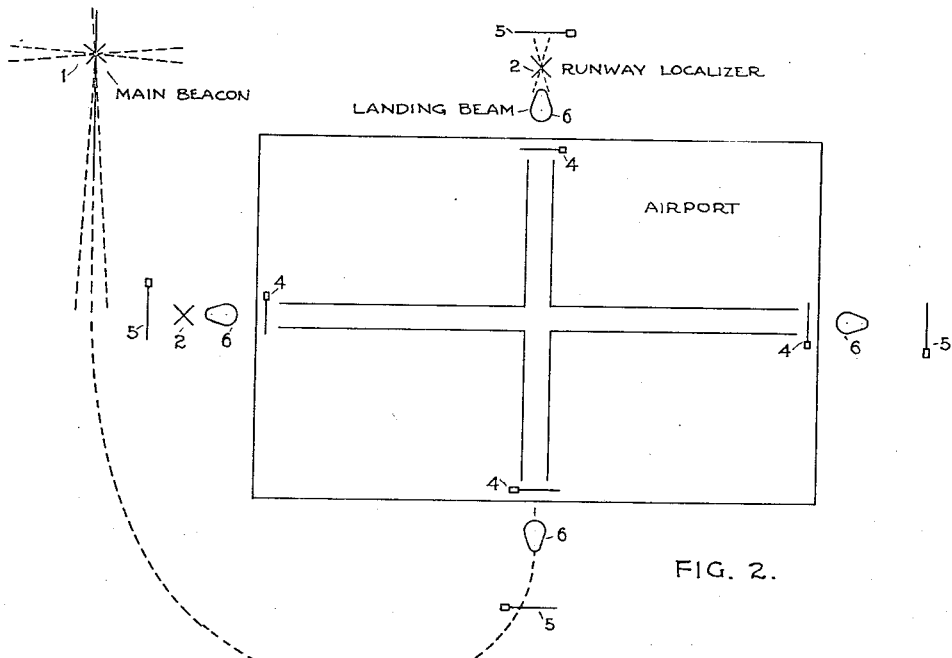
Figure 2 illustrates an expansion of the facilities of Figure 1 in order to take care of variable wind directions at the airport.

Figure 2 shows an expansion of the system of Figure 1 giving details of the layout required in order to permit landing into the wind regardless of the wind direction at the airport. The arrangement shown is for a two-runway (four-approach) field. While it is feasible to locate the transmitter 2 in a pit at the center of the field and align its four courses (if a radiobeacon type transmitter is used) with the four runways, the transmitting equipment is simple enough to warrant duplication, two transmitters being shown in Figure 2, one at one end of each runway. Four landing beam transmitters 6 are required to give vertical guidance for each direction of approach. Four marker beacons 4 and four marker beacons 5 are shown, the required number being somewhat greater if an absolute altimeter is used in place of the landing beam system. At any given time but one localizing beacon 2, one landing beam transmitter 6 and a pair of marker beacons 4 and 5 are in operation, the direction of the wind controlling the selection of a set of beacons, in order that the aircraft may be landed into the wind.

Figure 3 shows one form of receiving equipment which may be used on the airplane in conjunction with the system of Figure 1. This receiving arrangement is for the case when the transmitters 1 and 2 are both directive radiobeacons (either 2 or both 1 and 2 being of the visual type), and the marker beacons 4 and 5 are radio transmitters operating on the same radiofraquency as the radiobeacon 2. No landing beam receiving equipment is shown since the landing beam transmitting and receiving equipment per se do not constitute a portion of my invention. Referring to Figure 3, the receiving set 7 is that normally carried on aircraft for utilizing the Government aids to aviation (including weather broadcast and radiobeacon service). This set operates in the medium-frequency band. Since the runway beacon is of the visual type, automatic volume control operation may be used with the receiving set. This is quite essential since the pilot, in making a landing, is concerned with so many things than an additional burden of close manual adjustment of receiving set sensitivity must be eliminated. Without automatic volume control close manual adjustment is required in order to keep the output signal of the receiving set within range for all distances of the receiver from the transmitter. One form of automatic volume control arrangement is shown at 8 in Figure 3. The volume control device operates through rectification of the alternating voltage across the course indicator terminals by means of cuprous-oxide rectifier 19 and application of the rectified voltage, after filtering by means of the smoothing filter 20, as a negative biasing voltage on the grids of the radio-frequency amplifying tubes of the receiving set by means of lead 21. An increase in the input voltage to the receiving set normally tending to increase the voltage across the visual indicator terminals is therefore accompanied by an increase in the negative bias on the radio-frequency amplifying tubes, and consequently by a reduction in the receiving set sensitivity such as to maintain substantially constant voltage across the course indicator. The operation of the distance indicator will now become apparent. Since increasing input voltage to the receiving set is accompanied by increasing negative biasing voltage on the grids of the radiofrequency amplifying tubes, the deflection of a direct-current milliammeter connected in the plate circuit of these tubes will decrease as the airplane approaches a given transmitter (to the frequency of which the airplane receiving set is tuned) and may be calibrated directly in distance from the transmitter. A sketch of an instrument so calibrated is shown at 9 in Figure 4. The value of the distance indicator in permitting the pilot to circle the runway beacon transmitter 2 of Figure 1 can readily be seen. Without the distance indicator it is possible for wind drift to make the path of the airplane a spiral on one side of the transmitter 2 when the pilot believes he is traveling along a circle with the transmitter 2 at its center. Under such conditions the pilot would fail to find the desired point 3 of Figure 1 from which safe approach to the airport can be had. The distance indicator is also useful during the approach to the airport giving the pilot definite and continuous indicator of his approximate distance from the airport and thus serving as an adjunct to the marker beacons.

Referring back to Figure 3 the visual course indicator employed for securing indication of the lateral position of the airplane with respect to the runway course and which may be connected in circuit at points 17, 17 (which may be a jack) may be either the reed indicator type or the reed converter with pointed type course indicator. Neither of these forms a portion of my invention. The filter unit 10 connected in the output of the receiving set 7 serves to direct the aural signals (1000 cycles) received when passing over the marker beacons to the pilot's headphones 35 and the visual beacon signals (usually below 100 cycles) received from the runway beacon to the visual course indicator. The condenser 11 bypasses all but the low frequencies from the visual indicator while the choke coil 12 and the condenser 13 keep the low frequencies from the head telephones connected in circuit at points 18, 18 (which may be a jack). The automatic volume control is connected across the course indicator terminals (17, 17) and consequently is actuated only by the runway beacon signals. The 1000-cycle marker beacon signal is therefore permitted to vary through a minimum even though the receiving-set output voltage (insofar as the course indicator is concerned) is maintained substantially constant.

While in the receiving arrangement described in connection with Figure 3 the marker beacon is assumed to operate on the same radio frequency as the runway beacon transmitter, it may operate on any other desired radio frequency, in which case a special marker beacon set is required on the airplane. I have employed an arrangement of the later type, with the runway beacon operating in the medium-frequency band and the marker beacon operating on 10,000 to 20,000 kilocycles, the marker beacon receiver being then coupled to the same receiving antenna as the medium-frequency beacon receiving set. The marker beacon may also be of a non-radio type, for example, a sound or photoelectric device, and still come within the limits of my invention.

Figure 5 shows the the details of the radio type of marker beacon as used in the system of Figures 1 and 2. A conventional type of oscillator 14 tuned to the desired radio frequency is employed with conventional coupling to the antenna 15. To secure tone modulation, say 1000 cycles, the plate supply is furnished from an alternator of the desired frequency through a step-up transformer 16, which also has a separate winding for the filament supply. It is, of course, evident that other modulation arrangements than that shown may be employed. The novel features of this marker beacon is the antenna 15 employed for securing highly localized marker beacon indication. This antenna is of a low horizontal type its average height above ground being 6 feet. The long dimension of the antenna is directed substantially perpendicular to the direction of approach to the airport, the antenna being made sufficiently long to allow for all reasonable lateral deviations of the aircraft from the true runway course. When using the conventional vertical receiving antenna on the airplane the pilot receives a signal from the marker beacon just before reaching it. This signal dies out when the airplane is directly over the marker beacon and becomes loud again just after the airplane has passed the marker beacon. The signal thus consists of two short dashes lasting only a second or two.

While the foregoing description of my invention embodies several preferred arrangements it is to be understood that other arrangements accomplishing the same results may be used for one or more of the elements of the system and come within the scope of my invention.

What I claim is:

1. In a method of landing an air-craft on a landing field equipped with a primary radio beacon in proximity to the field, a secondary or localizer radio beacon, boundary marker beacons and a landing beam transmitter located on the field, the steps which comprise receiving signals aboard said craft from said primary radio beacon, flying the craft in the direction of said primary radio beacon until a zero signal zone is reached indicating that said craft is approximately over said primary radio beacon, then receiving signals aboard said craft from the localizer beacon located on the landing field, determining the distance of said craft from the said localizer beacon by controlling the output volume of the signal received therefrom responsive to the amplitude of the received radio energy, indicating the distance of said craft from the localizer beacon and landing beam transmitter as an inverse function of the control effect exerted on the output volume of said signal, then flying the craft in a generally circular path about the localizer beacon at a pre-determined desired distance therefrom and at a pre-determined desired altitude until the landing beam of the landing beam transmitter is entered, then flying the craft along the landing beam towards the landing beam transmitter following a line of constant received signal on the under side of the axis of said landing beam, and finally leveling off and landing the aircraft when it is at a pre-determined distance from the said localizer beacon and said landing beam transmitter, as indicated by the control effect exerted on the output volume of the signal received from said localizer beacon.

2. In a method of navigating and landing an aircraft on a landing field equipped with a primary radio beacon in proximity to the field, a secondary or localizer directive radio beacon, and boundary marker beacons located on the field, the steps which comprise receiving signals aboard said craft from said primary radio beacon, flying the craft in the direction of said primary radio beacon until a zero signal zone is reached indicating that said craft is approximately over said primary radio beacon, then receiving signals aboard said craft from the localizer beacon located on the landing field, determining the distance of said craft from said localizer beacon by controlling the output volume of the signal received therefrom responsive to the amplitude of the received radio energy, indicating the distance of said craft from the localizer beacon as an inverse function of the controlling effect exerted on the output volume of said signal, flying the craft toward said localizer beacon until the craft is at a pre-determined desired distance therefrom, then flying the craft in a circular path about the localizer beacon while determining the angular travel of the craft about the localizer beacon in accordance with the number of directive signal paths crossed until a point is reached from which a safe approach to the airport may be had, then gliding toward the localizer beacon and finally leveling off and landing the air-craft when it is a pre-determined distance from the said localizer beacon as indicated by the controlling effect exerted on the output volume of the signal received from said localizer beacon.

HARRY DIAMOND.